Figure 1:
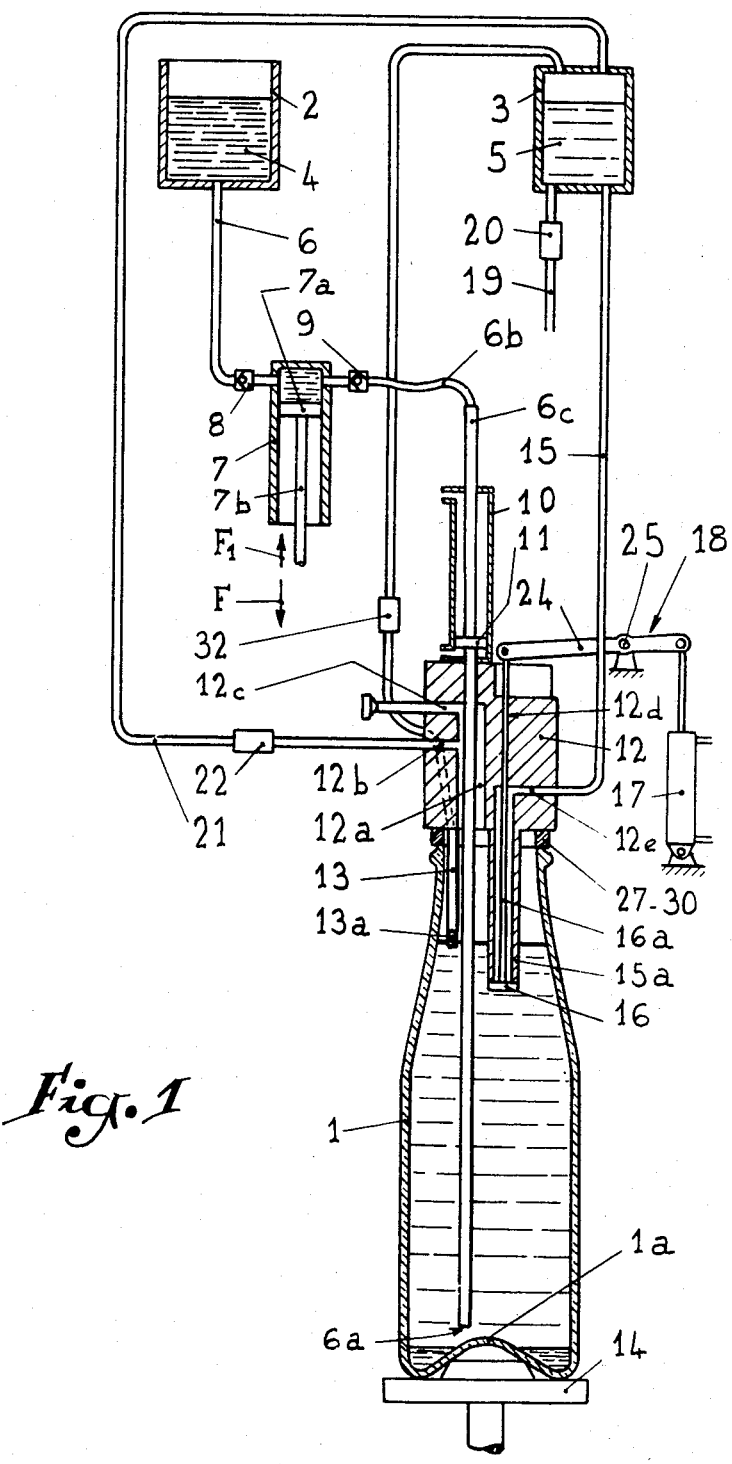

United States Patent [19]

Valentin et al.

[11] Patent Number: 4,538,652

[45] Date of Patent: Sep. 3, 1985

[54] DEVICE FOR INCORPORATING A DOSE OF LIQUEUR IN A BOTTLE OF CHAMPAGNIZED WINE

[75] Inventors: Jean Valentin, Montmort; Patrick Suply, Epernay; Stéphane Detrier, Fere en Tardenois, all of France

[73] Assignee: Etablissements F. Valentin, Epernay, France

[21] Appl. No.: 502,033

[22] Filed: Jun. 7, 1983

[30] Foreign Application Priority Data

Jun. 10, 1982 [FR] France ................. 82 10369

[51] Int. Cl.³ .............................. B67C 3/08
[52] U.S. Cl. .......................... 141/57; 141/37
[58] Field of Search ............ 141/5, 6, 9, 39, 40, 141/45, 100, 101, 37, 57

[56] References Cited

U.S. PATENT DOCUMENTS 1,799,590  4/1931  Kiefer .................. 141/45
1,978,002  10/1934  Weaver .............. 141/45 X
3,486,538  12/1969  Quest et al. ......... 141/39

Primary Examiner—Stephen Marcus
Assistant Examiner—Mark Thronson
Attorney, Agent, or Firm—Dowell & Dowell

[57] ABSTRACT

The present invention relates to a process and device for incorporating a dose of liqueur in a bottle of champagnized wine, wherein the device comprises a receptacle containing the liqueur which receptacle is connected to a pump from which the delivery is introduced near the bottom of the bottle. A tank under pressure containing champagne is connected to the interior of the bottle by a pipe provided with a valve. Another pipe with radial hole at the chosen fill level for the bottle emerges from the bottle and terminates in the tank. A conduit enables the bottle to be maintained at the same pressure as that prevailing in the tank. Via a channel in the head, the bottle may be placed under excess pressure to evacuate the surplus of wine via the pipe. The invention is particularly applicable to oenology.

7 Claims, 3 Drawing Figures

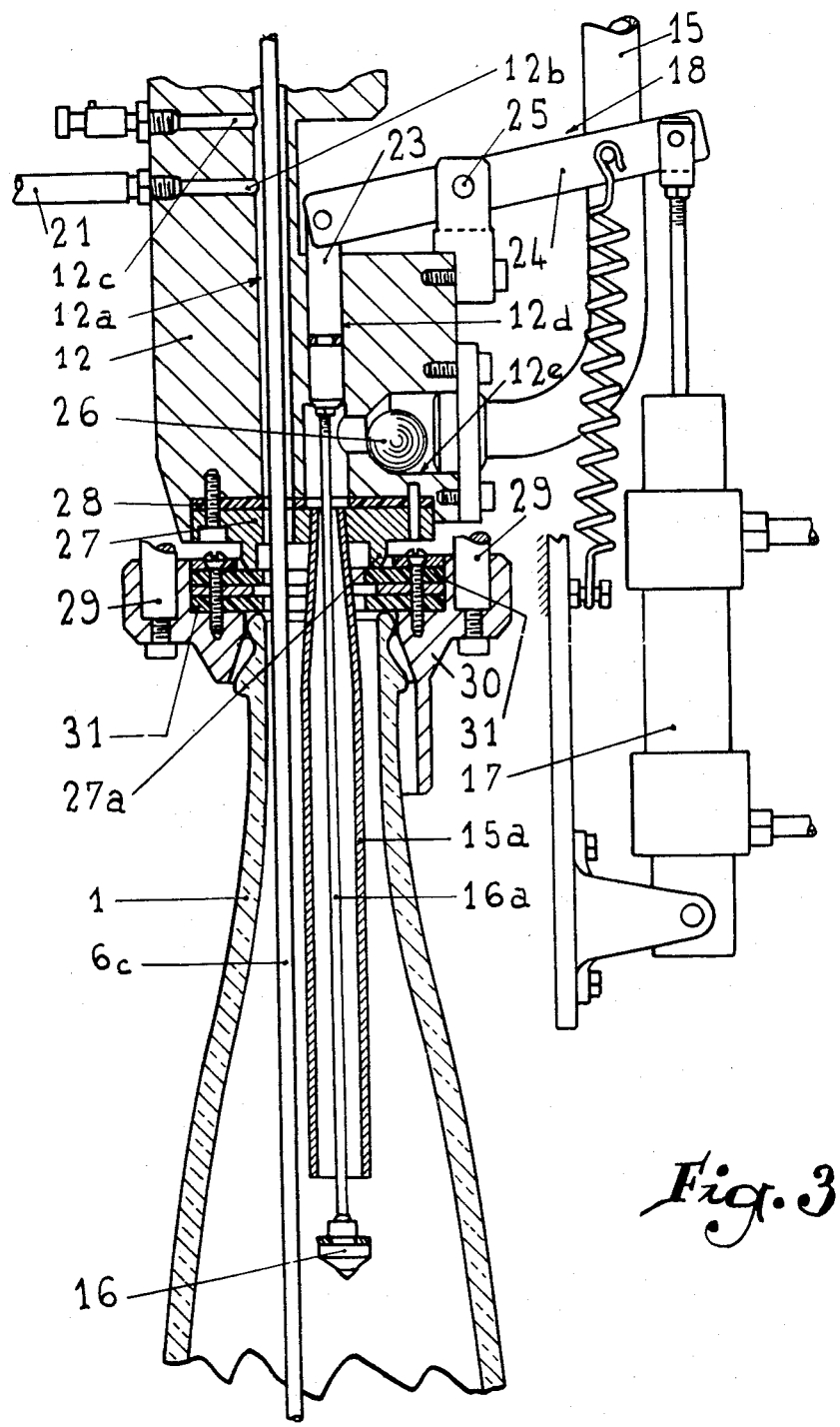

DEVICE FOR INCORPORATING A DOSE OF LIQUEUR IN A BOTTLE OF CHAMPAGNIZED WINE

The present invention relates to improvements for automatically correcting any variation in level in a bottle containing a liquid saturated with carbon dioxide gas, such as champagne, in the course of injection of a dose of liqueur or syrup, and to a device for carrying out this process.

It is known that, during champagnization of wine, it is necessary to introduce into each bottle a dose of liqueur or syrup made by concentration of 500 to 750 g of sugar per liter of wine.

At present, this injection is automatically effected by means of a complex machine which generally carries out three successive or simultaneous operations, namely, firstly, the tapping of a quantity of wine by pressurizing the liquid by means of an inert gas or carbon dioxide gas, then the introduction of the liqueur via a spout acting in the manner of a syringe, and finally the bringing of the liquid in the bottle to the final level by re-incorporating wine therein. This modus operandi presents serious drawbacks. Firstly, each of the three operations mentioned above results in undesired degasification of the wine which was previously saturated with carbon dioxide gas. At the end of the final filling, the wine therefore contains much less carbon dioxide gas, which is considerably detrimental to its quality. It is when the dose of liqueur is injected that the escape of gas is the greatest. In the conventional machines, injection is effected at the neck of the bottle which is inclined. As this introduction is effected under pressure and as the liquid, whose density varies from 1.18 to 1.28, is in the form of a multitude of crystals, the friction of each crystal on the wine produces an effervescence occurring over the whole height of the bottle.

Due to the release of gas provoked by the re-incorporation of wine in the final phase, filling is not uniform, certain bottles containing more liquid than others.

In addition, a great deal of foam spreads during the various operations, which represents an appreciable loss for the vintner.

Finally, it is necessary to adjust the spouts whenever the dosage is changed.

It is an object of the improvements according to the present invention to overcome these drawbacks and to produce a system for introducing the liqueur in one operational phase, the liqueur being injected against the bottom of the bottle so that the crystals pass through only a very small depth of liquid and this injection is effected under static pressure.

The invention will be more readily understood on reading the following description with reference to the accompanying drawings, in which:

FIG. 1 schematically shows, on a small scale, a device according to the invention.

Figure 2:
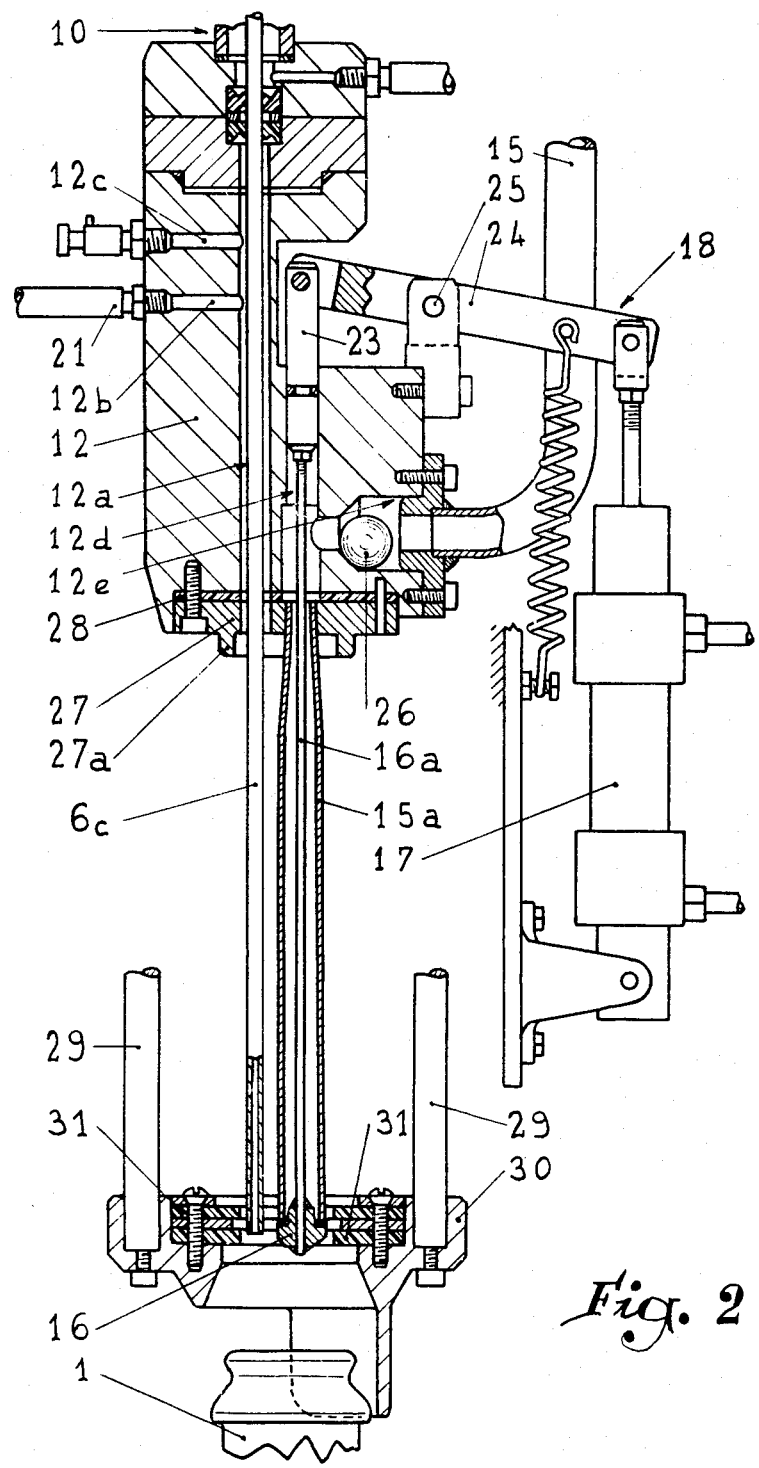

FIGS. 2 and 3 are partial views on a larger scale showing two different positions of the head.

Referring now to the drawings, FIG. 1 shows a device according to the invention adapted to introduce a dose of liqueur into a bottle 1 containing champagne. In fact, in the course of champagnization of wines, their taste must be sweetened by introducing a more or less large dose of liqueur whose characteristics have been discussed above. To obtain an extra-dry champagne, a small dose of liqueur (of the order of 1 to 2 cl) is injected, whilst, for a "medium-dry" champagne, the volume of the dose is about 6 cl.

According to the invention, a receptacle 2 and a tank 3 are provided, the receptacle containing a liqueur 4 produced as indicated hereinabove by means of wine to which is added a quantity of sugar of the order of 500 to 750 g per liter, whilst champagnized wine 5 is poured into the tank. Tank 3 is closed in order to be placed under pressure by means of a gas which is neutral with respect to the wine. From the bottom of the receptacle 2 emerges a tube 6 of which the free end 6a arrives in the immediate proximity of the top of the convex bottom 1a of the bottle 1. In this tube is inserted a displacement pump 7 comprising in conventional manner an upstream valve 8 and a downstream valve 9. The piston 7a of the pump is provided with a reciprocating rod 7b which, when it is lowered (direction of arrow F), enables a determined dose of liquid to be stored in this pump, this dose being injected when the rod 7b is pushed in the opposite direction, i.e. in the direction of arrow F1. The functioning of the pump will not be described in greater detail as it is a conventional pump. The presence of valves 8 and 9 is indispensable and allows a precise dosage. At the outlet of valve 9, the tube 6 comprises a flexible protion 6b opening into a rigid portion 6c which passes through a cylinder jack 10 containing a piston 11 which is fixed to the periphery of said rigid tube position. In this way, depending on the position of the piston 11, the opening 6a of the tube 6 is at a lesser or greater distance below the head 12 of the device according to the invention. Part of the reciprocating movement of the tube 6c through this head is effected by pressure in a passage 12a of larger diameter than that of cylinder 10 and into which open out two channels 12b and 12c, whose role will be more readily explained hereinbelow.

A pipe 13 joins the upper part of the sealed tank 3 and the base of the head 12 so that this pipe projects below the latter with a view to penetrating in the bottle 1 when the latter abuts against the head 12, i.e. when it has been applied thereagainst by means of an elevator plate 14.

The bottom of the sealed tank 3 is connected to the interior of the bottle via a pipe 15 passing through the head 12 and which communicates with a pouring spout 15a whose end is provided with a cock in the form of a valve 16 extended upwardly by a rod 16a which is actuated in reciprocating motion by means of a cylinder jack 17 and a bell crank lever 18.

A conduit 19 has also been provided, entering into the sealed tank and adapted to maintain constant the level of liquid therein. This conduit includes a stop valve 20.

The channel 12b is connected to a conduit 21 entering the upper part of the sealed tank, i.e. about the level of the liquid. A stop valve 22 is provided in conduit 21.

FIGS. 2 and 3 illustrate the manner in which the head 12 operates. In particular, it is seen that the end of the rod 16a carrying the valve 16 is associated with a slide 23 hermetically sealed to slide in a vertical bore 12d in the head, the free end of the slide 23 being coupled to a lever 24 pivoting about a pin 25 so that the jack 17 can achieve opening of the valve 16 for opening of the spout 15a. The pipe 15 arrives in a chamber 12e in the head 12 which provides a seat for a ball 26 as is conventional in bottling machines to avoid the liquid flowing out of the spout 15a in the event of the bottle 1 breaking.

The lower face of the head 12 is provided with a flange 27 applied against the head via an O-ring 28 and which comprises a downwardly directed neck 27a.

In head 12 are formed passages (not shown) for receiving sliding guide rods 29 whose lower ends are associated with a collar 30 comprising a series of seals 31 ensuring sealing thereof with the head 12 when this collar is lifted, and when these seals abut against the neck 27a, as illustrated in FIG. 3.

Functioning follows from the foregoing explanations:

Each bottle in low position is raised by the elevator plate 14 so that the end of its neck comes into abutment against the underside of the stack of seals 31 of the collar 30 which therefore rises until this stack comes into abutment against the neck 27a of the head 12 (position of FIG. 3).

At the same time as the bottle is raised, the rigid portion 6c of tube 6 has descended driven by jack 10 so that its free end 6a is located at the level of the inner face of the convex bottom 1a of the bottle 1.

The valve 22 is then opened electrically or otherwise, so that the pressure prevailing in the sealed tank 3 above the liquid is established above the wine contained in the bottle 1 and which is charged with a gas which is neutral with respect to the wine under a constant, controlled pressure of for example three to four bars. When the valve 22 is opened, the gas contained in the sealed tank passes through channel 12b and passage 12a so that it penetrates into bottle 1. Of course, the seal of passage 12a is ensured in the upper part of head 12 by a seal (not shown).

As soon as the bottle 1 is subjected to the aforesaid pressure, the valve 16 is opened and the pump 7 is switched on so as to inject a dose of liqueur into the bottom of the bottle 1.

As the pressure in the bottle is equal to that in the sealed tank 3, the liquid flows through pipe 15 without affecting the open position of the ball 26 and the wine pours through spout 15a into the bottle 1. Of course, the valve 16 has been opened using the jack 17. The pipe 13, which has not been shown in FIGS. 2 and 3 in order not to complicate the drawing, is provided, as is well known in the art, with a radial hole 13a located exactly at the desired level of the wine in the bottle after the liqueur dosing operation has been carried out.

If, prior to this operation, the level of the wine in the bottle is too high, there is no flow from spout 15a and, on the contrary, the wine located above hole 13a is delivered through the pipe 13 in the direction of tank 3. In this way, at the end of injection of the dose of liqueur, the level is substantially at the desired spot. If, on the contrary, there is not enough wine in the bottle, wine flows from spout 15a until the level reaches the radial hole 13a after the dose has been injected.

The last operation consists in introducing via channel 12c, through a branch element (not shown), an excess pressure above the wine in the bottle 1 after the valve 16 and the valve 22 have been closed. It will be readily understood that this excess pressure ensures evacuation of any excess liquid from the bottle via the pipe 13 so that the level is established exactly level with its radial hole 13a. It will be noted that the wine cannot be decanted via the tube 6 due to the presence of the non-return valve 9.

Finally the excess pressure is progressively eliminated by opening a cock placed at the opening of channel 12c, after closure of a valve 32 inserted in pipe 13.

A device for incorporating a dose of liqueur in a bottle of sparkling wine has thus been produced, which makes it possible firstly to inject the liqueur without it mixing with the wine, so that the wine may be filled simultaneously with this injection and without creating emulsion in the wine, to avoid the wine foaming and losing its $CO_2$ content, due to the pressure which is established in the bottle during the whole duration of the operation and, finally, makes it possible to handle the wine no more than is necessary, as each operation involves a reduction of $CO_2$ saturation of the wine.

It must be understood that the foregoing description has been given only by way of example and that it in no way limits the domain of the invention which would not be exceeded by replacing the details of execution described by any other equivalents.

What is claimed is:

1. A device for injecting a dose of liqueur into a bottle containing a liquid saturated with a gas, and for correcting the height of the liquid to a chosen level while maintaining the gas saturation of the liquid comprising:
   (a) a gas-pressurized closed tank containing saturated liquid;
   (b) a head operative to seal against the bottle above said chosen level;
   (c) first pipe means connected from the tank through the head into the interior of the bottle and having first valve means operative to open the pipe means for selectively introducing liquid from the tank into the bottle;
   (d) dose injection means including an injection tube extending through the head and having an open free end positioned to be located substantially at the bottom of the bottle;
   (e) means for pressurizing the interior of said bottle to a pressure in excess of the pressure of the saturating gas in the bottle;
   (f) means for delivering excess liquid from above the chosen level in the bottle into said closed tank when the interior of the bottle is pressurized at said excess pressure; and
   (g) means for selectively eliminating said excess pressure in the bottle.

2. A device according to claim 1, wherein said dose injecting means comprises a pump coupled with said tube, the tube being supported by a cylinder jack where it passes through said head, and the jack being operative to recriprocate the tube in the head to locate its free end near the bottom of the bottle.

3. A device according to claim 1, further including means for pressurizing said bottle with gas from said closed tank said gas being neutral with respect to the liquid in said tank.

4. A device according to claim 1, wherein said means for delivering excess liquid from said bottle to said tank comprises second pipe means extending from the tank above the liquid therein through the head and into the bottle, the second pipe means having a hole located at the chosen level for the liquid in the bottle and having second valve means operative selectively to open the second pipe means when the bottle is at said excess pressure to withdraw excess liquid to the level of said hole.

5. A device according to claim 1, further comprising a pressure conduit coupled through said head into the upper part of said bottle and including a stop valve.

6. A device according to claim 1, wherein said means for pressurizing the interior of said bottle comprises a pressure conduit coupled through said head into the bottle, second pipe means extending from the tank above the liquid through the head and into the bottle, and the second pipe means having a hole located at the chosen level for the liquid in the bottle and having second valve means operative selectively to open the second pipe means when the bottle is at said excess pressure to withdraw excess liquid to the level of said hole.

7. A device according to claim 6, wherein said means for pressurizing the interior of the bottle and for eliminating said excess pressure further comprises a cock in said conduit, the cock being open when the second valve means is closed.

* * * * *